(12) United States Patent
Fourquin et al.

(10) Patent No.: US 11,706,040 B2
(45) Date of Patent: Jul. 18, 2023

(54) METHOD OF IMPLEMENTING A PHYSICAL UNCLONABLE FUNCTION

(71) Applicant: THALES DIS FRANCE SAS, Meudon (FR)

(72) Inventors: Olivier Fourquin, Meudon (FR); Alexandre Berzati, Meudon (FR); Benjamin Duval, Meudon (FR)

(73) Assignee: THALES DIS FRANCE SAS, Meudon (FR)

( * ) Notice: Subject to any disclaimer, the term of this patent is extended or adjusted under 35 U.S.C. 154(b) by 186 days.

(21) Appl. No.: 17/296,517

(22) PCT Filed: Dec. 5, 2019

(86) PCT No.: PCT/EP2019/083883
§ 371 (c)(1),
(2) Date: May 24, 2021

(87) PCT Pub. No.: WO2020/120290
PCT Pub. Date: Jun. 18, 2020

(65) Prior Publication Data
US 2022/0029835 A1 Jan. 27, 2022

(30) Foreign Application Priority Data
Dec. 12, 2018 (EP) .................... 18306677

(51) Int. Cl.
*H04L 9/32* (2006.01)
*H04L 9/00* (2022.01)

(52) U.S. Cl.
CPC .................. *H04L 9/3278* (2013.01)

(58) Field of Classification Search
CPC .................................. H04L 9/3278
See application file for complete search history.

(56) References Cited

U.S. PATENT DOCUMENTS 8,415,969 B1 * 4/2013 Ficke ..................... G06F 7/588
326/8
8,981,810 B1 * 3/2015 Trimberger .......... H03K 19/003
326/8
(Continued)

FOREIGN PATENT DOCUMENTS

CN 107194117 A 9/2017

OTHER PUBLICATIONS

PCT/EP2019/060525, International Search Report, dated May 8, 2019, European Patent Office, P.B.5818 Patentlaan 2 NL—2280 HV Rijswijk.
(Continued)

*Primary Examiner* — Gary S Gracia (57) ABSTRACT

A method of identifying primitives for implementing a physical unclonable function providing a response representative of a device comprising a plurality of primitives coupled in pairs, said primitives being configured for being one-time programmable through application of a burning energy to said primitives, by selecting a subset of the pairs, assessing a difference between electrical characteristics values provided by primitives belonging to each pair of said subset, qualifying all pairs of primitives for which the assessed difference is higher than a reference threshold, and identifying said qualified pairs of primitives comprising programming at least one primitive of each pair of primitives for which the assessed difference is lower than said reference threshold, by applying a burning energy to said at least one primitive so as to differentiate qualified pairs of primitives from those that are not qualified.

12 Claims, 5 Drawing Sheets

(56) References Cited

U.S. PATENT DOCUMENTS

| | | | |
|---|---|---|---|
| 9,082,514 B1* | 7/2015 | Trimberger | G11C 29/06 |
| 9,279,850 B1* | 3/2016 | Pedersen | G01R 27/2605 |
| 9,806,719 B1* | 10/2017 | Mathew | H03K 19/003 |
| 9,992,031 B2* | 6/2018 | Gotze | G09C 1/00 |
| 10,468,104 B1* | 11/2019 | Anand | H04L 9/3278 |
| 10,764,069 B1* | 9/2020 | Hurwitz | H04L 9/0866 |
| 2011/0002461 A1* | 1/2011 | Erhart | G06F 21/73 340/5.83 |
| 2011/0317829 A1* | 12/2011 | Ficke | H04L 9/3278 380/46 |
| 2012/0081143 A1* | 4/2012 | Behrends | H04L 9/0866 326/8 |
| 2013/0051552 A1* | 2/2013 | Handschuh | H04L 9/0897 380/44 |
| 2014/0253007 A1* | 9/2014 | Shokrollahi | H02P 31/00 318/490 |
| 2015/0236693 A1* | 8/2015 | Pfeiffer | H03K 19/003 326/8 |
| 2017/0200508 A1* | 7/2017 | Grigoriev | H04L 9/0866 |
| 2018/0013431 A1* | 1/2018 | Bury | H04L 9/0861 |
| 2018/0062864 A1* | 3/2018 | Kim | H04L 9/001 |
| 2019/0026724 A1* | 1/2019 | Wade | G07F 7/1016 |
| 2019/0028284 A1* | 1/2019 | Rezayee | H04L 9/14 |
| 2020/0274722 A1* | 8/2020 | La Rosa | G11C 16/10 |
| 2020/0274723 A1* | 8/2020 | La Rosa | H04L 9/0656 |
| 2021/0036874 A1* | 2/2021 | Thapliyal | G09C 1/00 |
| 2021/0184870 A1* | 6/2021 | Hurwitz | G06F 21/73 |
| 2021/0203513 A1* | 7/2021 | Chang | G11C 13/0026 |
| 2021/0303735 A1* | 9/2021 | La Rosa | H04L 9/3278 |
| 2021/0336804 A1* | 10/2021 | Parhi | G06F 21/73 |
| 2021/0365553 A1* | 11/2021 | Hirano | G06F 21/84 |
| 2022/0029835 A1* | 1/2022 | Fourquin | H04L 9/3278 |

OTHER PUBLICATIONS

PCT/EP2019/060525, International Search Report, dated May 8, 2019, European Patent Office, D-80298 Munich.

PCT/EP2019/083883, International Search Report, dated Feb. 19, 2020, European Patent Office, P.B.5818 Patentlaan 2 NL—2280 HV Rijswijk.

PCT/EP2019/083883, Written Opinion of the International Searching Authority, dated Feb. 19, 2020, European Patent Office, D-80298 Munich.

* cited by examiner

METHOD OF IMPLEMENTING A PHYSICAL UNCLONABLE FUNCTION

FIELD OF THE INVENTION

The present invention relates to methods of implementing Physically Unclonable Functions (PUF). It relates particularly to methods of implementing a PUF for a device comprising a plurality of electronical primitives.

BACKGROUND OF THE INVENTION

A Physically Unclonable Function (PUF) is a function that is embodied in a physical structure and is easy to evaluate but extremely difficult to predict. An individual PUF device must be easy to make but practically impossible to duplicate, even given the exact manufacturing process that produced it. The intrinsic PUF microstructures characteristics depend on random process variations during manufacture that are uncontrolled and cannot be monitored. Hence, when a physical stimulus is applied to the structure, it reacts in an unpredictable way due to the complex interaction of the stimulus with the physical microstructure of the component. The applied stimulus is called the challenge, and the reaction of the PUF is called the response. A specific challenge and its corresponding response together form a challenge-response pair which is specific to a given device. Such a PUF function may be used for example as a seed for cryptographic applications or for authentication of the PUF device.

A PUF of a chip may be based on its electronic components. Given the natural variations in the behavior of the electronic components (especially due to environmental conditions like temperature or power supply), a PUF response may not always be the same for a given challenge. In order to avoid errors in a process based on a PUF response, such as authentication, such a challenge-response pair must be steady. Consequently, existing PUF based processes include treatments to filter out the raw response of the PUF in order to obtain a refined response which is steady. Such filtering process is known as post-processing operations during the generation of a PUF response. It is to be noted that post processing operations is generally a part of PUF running.

Unfortunately, such post processing operations are time-consuming since they are run each time a PUF response is generated. This is particularly an issue for PUF device with low computation power such as smartcards. In addition, such devices also include little available non-volatile memory for storing data needed to produce a stable PUF response.

Consequently, there is a need for a method enabling the generation of a stable and reliable response of a PUF of an electronic device, while requiring less computational power and no non-volatile memory.

SUMMARY OF THE INVENTION

The invention aims at solving the above mentioned technical problem.

For this purpose and according to a first aspect, this invention therefore relates to a method of identifying primitives for implementing a physical unclonable function providing a response representative of a device, wherein said device comprises a plurality of primitives coupled in pairs, and wherein said primitives are configured for being one-time programmable by changing their state from a not-programmed state to a programmed state through application of a burning energy to said primitives, characterized in that said method comprises the following steps:

selecting a subset of the pairs, assessing a difference between electrical characteristics values provided by primitives belonging to each pair of said subset, qualifying all pairs of primitives for which the assessed difference is higher than a reference threshold, and identifying said qualified pairs of primitives, said identifying step comprising a step of programming at least one primitive of each pair of primitives for which the assessed difference is lower than said reference threshold, by applying a burning energy to said at least one primitive so as to differentiate qualified pairs of primitives from those that are not qualified.

Such a method enables to test the reliability of the primitives before producing any PUF response and to discard primitive pairs whose output variations would cause variations in the PUF output itself. Using the discarded primitives as OTP cells enables to keep track of which primitives are qualified and which are not without using any memory of the device.

The reference threshold may be adjusted in function of a targeted ratio of qualified pairs to all pairs of the subset.

Such an adjustment enables to finely adjust the size of the subset of pairs.

At least one primitive of the device being a transistor, the step of programming at least one primitive may comprise applying a voltage on a gate of at least one transistor.

Applying such a voltage enables to break the gate of the transistor which turns it into a programmed state that can be read later on.

Both primitives of each pair of primitives for which the assessed difference is lower than said reference threshold may be programmed.

According to a second aspect, this invention therefore relates also to a method for executing a physical unclonable function of a device, wherein said device comprises a plurality of primitives coupled in pairs, and some of said pairs of primitives have been identified as qualified according to the method according to the first aspect, characterized in that said method comprises the following steps:

reading a state of all primitives of said device, based on said read states, differentiating the qualified pairs of primitives identified according to the method according to the first aspect, generating a physical unclonable function response only from primitives belonging to said qualified pairs.

Such a method enables to efficiently find out, before issuing a PUF response, which primitives have been qualified and may be used for generating the PUF response, at a very low cost. It is applicable even to devices without any available NVM.

At least one primitive of the device being a transistor, the step of programming at least one primitive comprising applying a voltage on a gate of at least one transistor, the step of reading a state of a primitive of said device may comprise when said primitive is a transistor:

injecting a current through a gate of said transistor, comparing a voltage of said gate to a voltage reference, based on said comparison, determining the state of said primitive.

Such a method enables to detect if the gate of the transistor has been broken or not, and therefore if the transistor has been programmed or not.

According to a third aspect, this invention therefore relates to a device comprising a plurality of primitives coupled in pairs, wherein said primitives are configured for being one-time programmable by changing their state from a not-programmed state to a programmed state through application of a burning energy to said primitives characterized in that the device comprises:
a selector configured to select a subset of the pairs of primitives,
a comparator configured to assess a difference between electrical characteristics values provided by primitives belonging to each pair of the subset, and configured to qualify all pairs of primitives for which the assessed difference is higher than a reference threshold, said qualified pairs corresponding to primitives selected for implementing a physical unclonable function providing a response representative of the device,
and a programming circuit configured to program at least one primitive of each pair of primitives for which the assessed difference is lower than said reference threshold, by applying a burning energy to said at least one primitive so as to differentiate qualified pairs of primitives from those that are not qualified.

The device may also comprise a generator configured to generate a PUF response by running the physical unclonable function, the generator being configured to generate the response from only the qualified pairs.

The device may be a chip or a system-on-a-chip.

The device may be a printed circuit board and primitives may be electronic components.

At least one primitive of the device may be a transistor.

The device may be a RFID tag.

BRIEF DESCRIPTION OF THE DRAWINGS

Other characteristics and advantages of the present invention will emerge more clearly from a reading of the following description of a number of preferred embodiments of the invention with reference to the corresponding accompanying drawings in which.

DETAILED DESCRIPTION OF THE PREFERRED EMBODIMENTS

The invention aims at making stable the output of the Physically Unclonable Function of a device.

It may apply to any type of electronic devices comprising a plurality of active electronic primitives. In this document, a primitive is an active electronic unit or electronic component. Preferably, the primitive is a basic electronic unit. For example primitives may be transistors, vias, resistances, capacitors, ring oscillators or SRAM cells.

In the following examples, the electronic device is a chip but it could be any other kind of integrated circuit, system-on-a-chip (SOC) or printed circuit board (PCB). It may for example be a RFID tag.

Each bit of a PUF response of a device including a PUF function is usually generated based on a comparison between the outputs of two primitives of the device. In order to guarantee the unpredictability and uniqueness of the PUF function, such primitives are usually designed as identical but in fact behave slightly differently because of microstructure differences depending on random process variations during manufacture. The distribution of the electrical characteristics of a set of primitives follows a normal law.

The output of a bit of the PUF, derived from a comparison between outputs of two primitives, may be unstable if the result of such a comparison varies, for example depending on environmental conditions such as temperature.

The first main idea of the invention is to test the bits of the PUF function before issuing any response and to discard any bit that would be identified as unstable. In order to do so, primitive pairs are qualified as stable only when they provide outputs sufficiently far from each other so that the sign of a comparison between them remains stable despite small variations of these two output values. During such a pre-processing phase, pairs for which the primitive outputs difference is below a target threshold are rejected and identified as not robust. Reciprocally, pairs for which primitive difference is higher than a target threshold are identified as robust and qualified for constituting the PUF response. As a result, each qualified pair of primitives corresponds to one bit of future PUF responses.

In order to avoid testing the PUF function each time a PUF response shall be generated, the identity of the qualified pairs of primitives shall be memorized. A common way to do so would be to store such an identity in a memory of the PUF device. Nevertheless, such a solution requires some amount of non-volatile memory to be available, which may not be the case in devices with small amounts of free NVM, such as smartcards. The second main idea of the invention is therefore to use unqualified pair of primitives as one-time programmable (OTP) cells and to program it in order to mark it down as not reliable.

According to a first aspect, the invention relates to a method of identifying primitives for implementing a PUF function providing a response representative of the device. The steps of this method are described in details in the following paragraphs and shown on FIG. 1.

Figure 2:
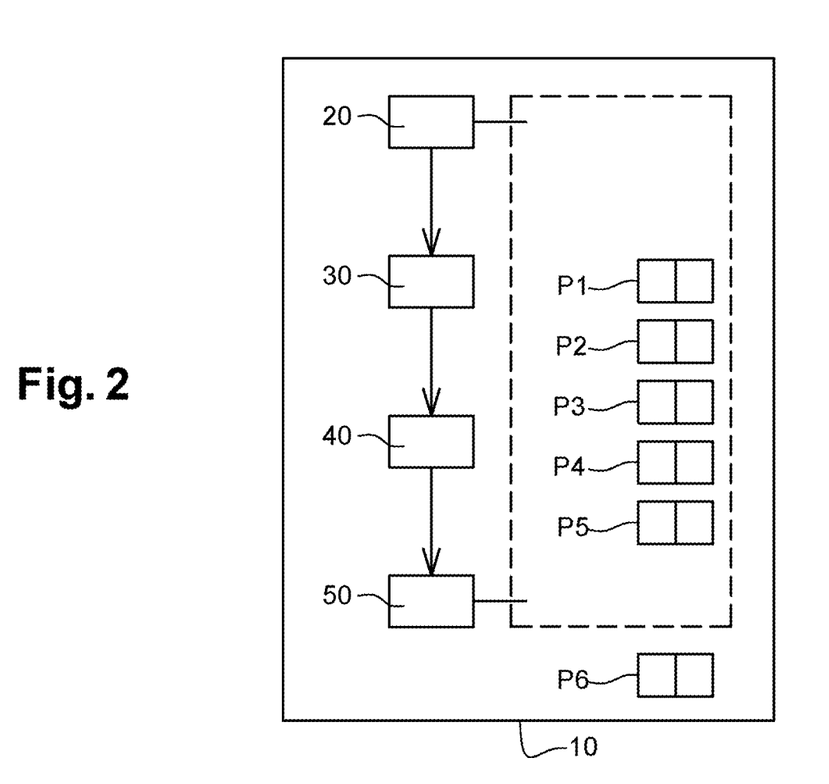
FIG. 2 depicts schematically an example of a device configured to select electronic primitives for a PUF and to generate a PUF according to an embodiment of the invention.

According to a second aspect, the invention relates to an electronic device 10 implementing a PUF and configured to select electronic primitives for this PUF and to generate a PUF response according to an embodiment of the invention, as shown on FIG. 2.

The device 10 may be a chip comprising a large number of electronic primitives which are coupled in pairs P1, . . . , P6. The primitives are configured for being one-time programmable by changing their state from a not-programmed state to a programmed state through application of a burning energy to it.

Figure 1:
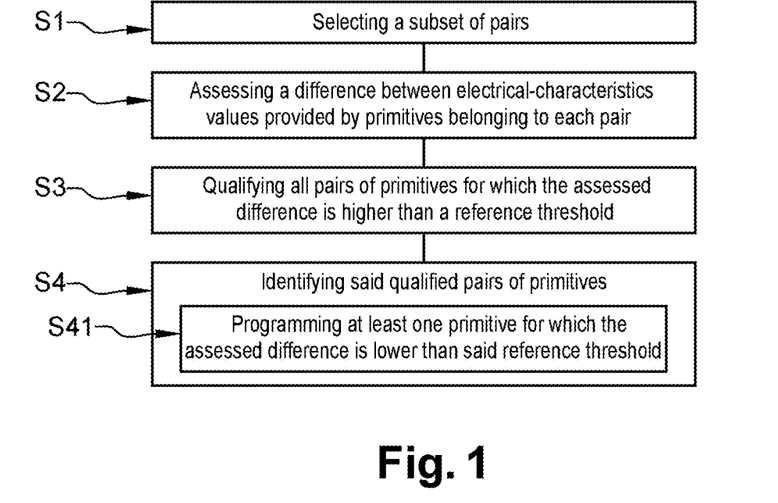
FIG. 1 is a schematic illustration of a method for identifying primitives for implementing a PUF function providing a response representative of the device according to an embodiment of the present invention.

The device 10 comprises a selector 20 configured to select a subset of the pairs of primitives. During a selection step S1, the selector selects such a subset of primitives to be tested.

The device also includes a comparator 30 which is configured to assess a difference between electrical characteristics values provided by primitives belonging to each pair of the subset during an assessing step S2, and to qualify the pair of primitives showing a difference higher than a reference threshold during a qualification step S3.

In a preferred embodiment, the electrical characteristics is the current. Alternatively, it may be the voltage for example.

The qualified pairs contain the primitives which are selected for implementing the physical unclonable function (PUF) that provides a response representative of the device 10.

The value of the reference threshold and/or the number of pairs to be used may be adjusted according to a targeted number of qualified pairs.

The comparator 30 may determine if the difference between electrical characteristics values provided by two primitives is higher than the reference threshold by applying an offset to one of these two electrical characteristics values.

In another embodiment, the comparator 30 may be located outside the device 10 itself.

The device 10 also includes a programming circuit 40 that may be used during an identification step S4 to use some of the primitives as OTP cells for identifying the pairs of primitives qualified during the qualification step S3. In order to do so, the programming circuit is configured to program at least one primitive of each pair of primitives for which the assessed difference is lower than said reference threshold, during a programming step S41. This may be done by applying a burning energy to said at least one primitive so as to differentiate qualified pairs of primitives from those that are not qualified.

In an embodiment, only one primitive is programmed in each pair of primitives for which the assessed difference is lower than said reference threshold.

Alternatively, both primitives of each pair of primitives for which the assessed difference is lower than said reference threshold are programmed. In such a case, the two primitives of each such pair may be programmed at the same time or sequentially.

This method is run once, preferably before the issuance of the device. For example it may be executed during the personalization phase of the device.

Thus when the PUF is run, it is possible to detect which primitives have been previously programmed and to generate a PUF response based on the other primitives of the selected subset which were not programmed and have therefore been qualified.

In a preferred embodiment, the device 10 also comprises a generator 50 configured to generate a PUF response by running the physical unclonable function, from only the qualified pairs.

Figure 3:
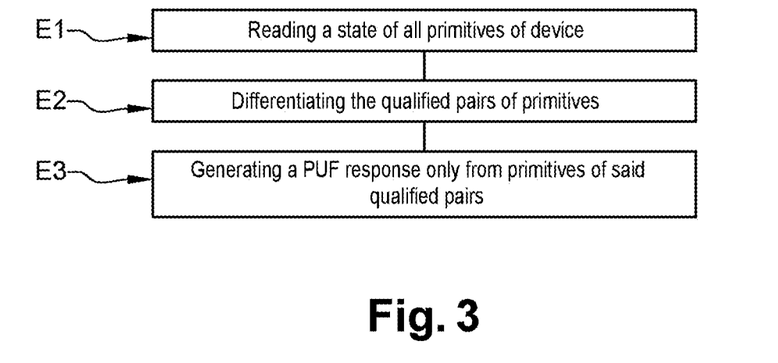
FIG. 3 is a schematic illustration of a method for executing a physical unclonable function of a device according to an embodiment of the present invention.

Such a generator performs a method according to a third aspect of the invention whose steps are described in the following paragraphs and illustrated on FIG. 3.

During a reading step E1, the generator reads a state of all primitives of said device. Such a state may be either programmed or not programmed.

During a differentiating step E2, based on the states read during the reading step E1, the generator differentiates the qualified pairs of primitives which have been previously identified as qualified during an identification step S4 as described here above. Such qualified pairs are the ones for which no primitive of the pair is in the programmed state.

During a generation step E3, the generator generates a physical unclonable function response only from primitives belonging to the qualified pairs.

In a first embodiment, a response is generated based on all pairs of the subset of primitives and the response bits of the pairs which are not qualified are discarded before outputting the PUF response.

Alternatively, response bits are generated by the qualified pairs only.

Figure 4:
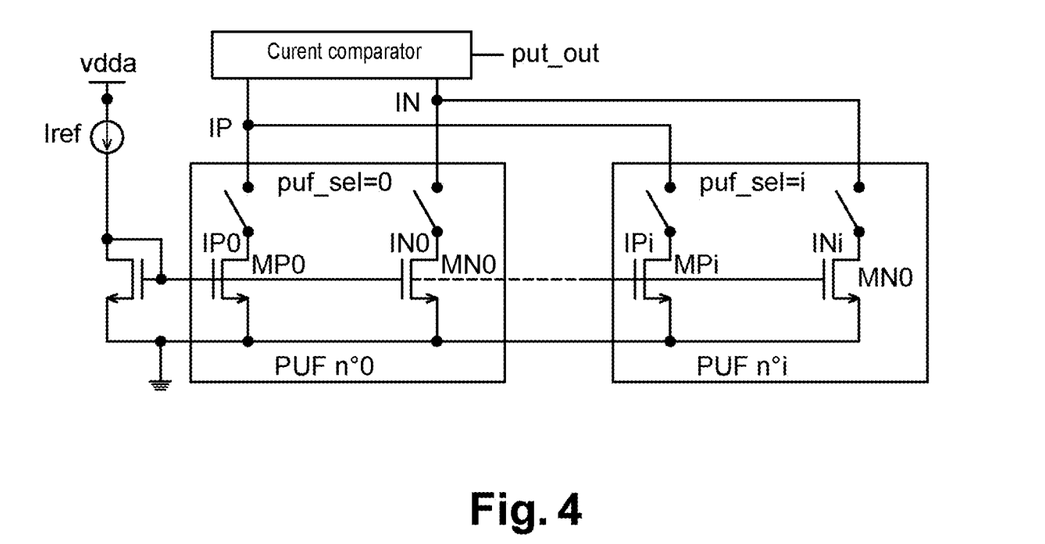
FIG. 4 depicts a schematic and block diagram representation illustrating an example circuit for implementing a device realized with current mirror according to an embodiment of the invention.

FIG. 4 shows a schematic and block diagram representation illustrating an example circuit for implementing primitives realized with current mirror according to an embodiment of the invention.

In this example, the PUF design is based on comparison of identical primitives. More precisely, it is based on current mirroring comparison.

The following legend applies:

vdda=power supply.

Iref=current reference.

IP and IN=Positive and Negative Input of current comparator.

Mpi and Mni=PUF cell primitives of PUF bit n°i.

IPi and INi=current output from primitive Mpi and Mni.

puf_sel=vector allowing to select the primitives of a PUF bit.

Puf n°i=unit cell of PUF bit i.

NB: When puf_sel=i, Puf_n°i is addressed, current issue from primitives Mpi and Mni are compared (respectively IPi and INi). In this case IP=IPi and IN=Ini.

Figure 5:
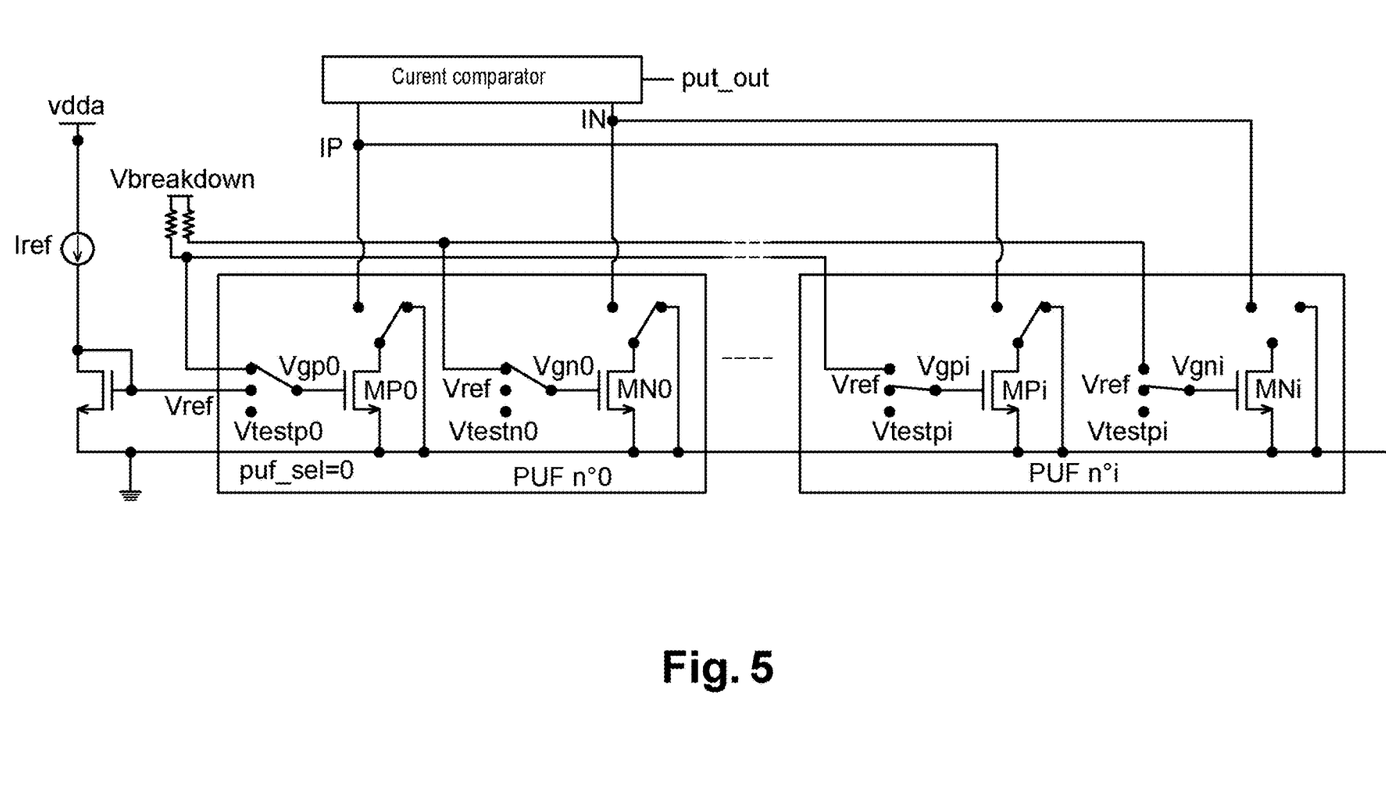
FIG. 5 depicts a schematic and block diagram representation illustrating an example circuit wherein primitives are transistors and for implementing a device realized with current mirror according to an embodiment of the invention.

In such an example where primitives are transistors, the step of programming at least one primitive may comprise applying a voltage on the gate of at least one transistor. In such a case, the PUF design shown as example on FIG. 4 may be adapted such as shown on FIG. 5. In such a design, in order to program a primitive, the switch connected to its gate is set to connect the gate to a voltage Vbreakdown, which is configured to be high enough to break the oxide gate. In another example, primitives may be programmed by applying to it a strong current.

Figure 6:
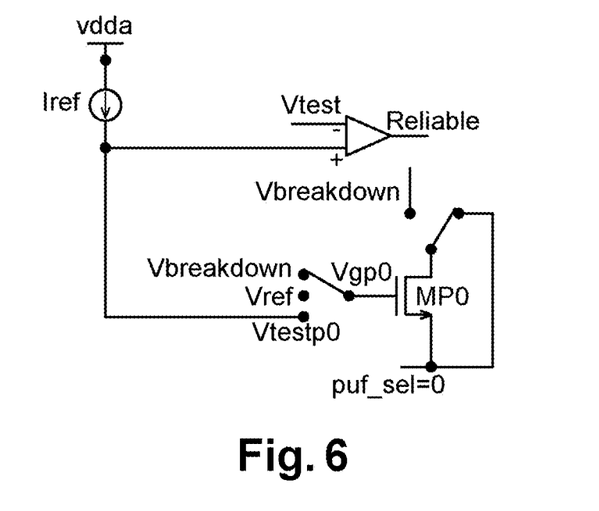
FIG. 6 a configuration of a PUF cell according to a design depicted on FIG. 5 when reading the state of a transistor MPO of this cell.

FIG. 6 shows a configuration of a PUF cell according to such a design when reading the state of a transistor MPO of this cell. During the reading step E1, the gate of the transistor is connected such that a current Itest is injected through the gate of the transistor. The resulting voltage Vtestp0 at the gate is compared to a test voltage Vtest.

If the transistor has been programmed, the transistor gate is broken and the transistor gate loads all the current, leading to a low gate voltage close to ground.

If the transistor has not been programmed, the transistor gate is intact and no current is loaded by the gate, leading to a gate voltage close to vdda.

As a result, the test voltage Vtest may be set such that during the reading step E1, the generator reads a programmed state if the comparison result between the gate voltage Vtestp0 and the test voltage Vtest is that Vtestp0<Vtest; and such that the generator reads a not-programmed state if the comparison result between the gate voltage Vtestp0 and the test voltage Vtest is that Vtestp0>Vtest.

Figure 7:
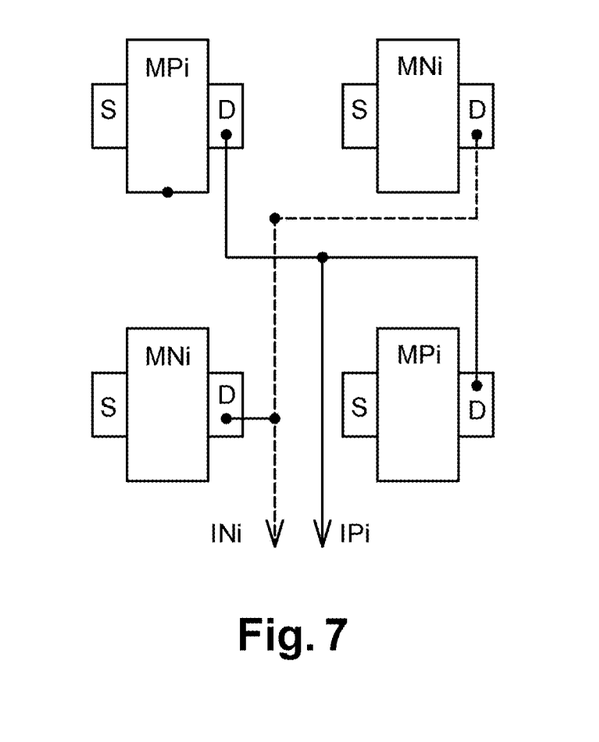
FIG. 7 depicts a preferred embodiment wherein the layout may be designed in common centroid manner.

In a preferred embodiment, the architecture is designed so as to reduce all deterministic variations. For example, the layout may be designed in common centroid manner as shown at FIG. 7.

It is to be noted that depending on application needs, PUF bits can be read sequentially for power saving or in parallel for speed optimization.

Figure 8:
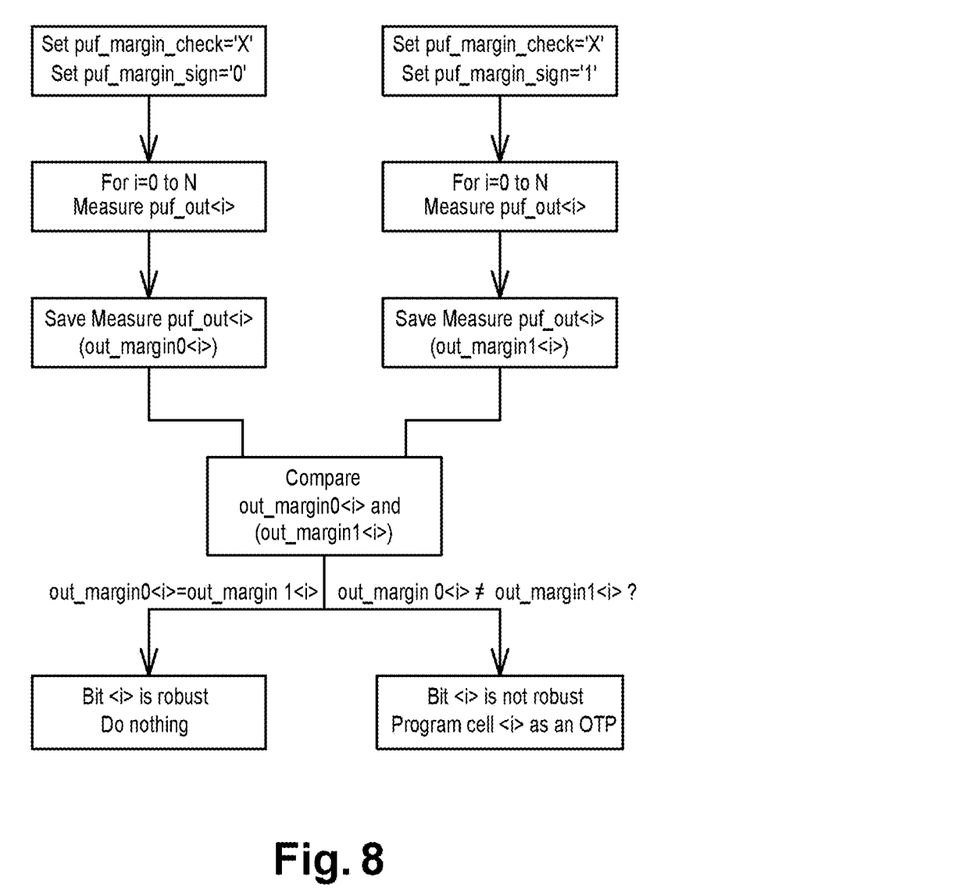
FIG. 8 shows a flow diagram illustrating example operations of a device for qualifying primitive pairs during pre-processing operations according to an embodiment of the invention.

FIG. 8 shows a flow diagram illustrating example operations of a device for qualifying primitive pairs during pre-processing operations according to the method according to the first aspect of the invention. Such preprocessing operations allows to reject pairs for which primitive difference is below a reliable threshold.

In such an example, an intentional offset is injected in the input of one of the primitives of a pair in order to evaluate the stability of the output of the comparator with respect to natural fluctuations. Only pairs having a stable comparator output will be qualified for being used in the response of the PUF.

According to this example, during the assessing step S2, a puf_margin_check value is defined and an offset value equal to the puf_margin_check value is applied to one of the electrical characteristics values of the two primitives of the pair being tested. For instance, the offset can be a 20% increase or decrease. The primitive to which the offset is applied is identified by the puf_margin_sign variable. A first comparison, between the electrical characteristics values of the two primitives of the pair being tested, is performed after applying the offset to one primitive; and another comparison is performed after applying the offset to the other primitive. By doing so, whatever which value is the higher between the two primitives' electrical characteristics values, one of these two comparisons is performed after decreasing the higher electrical characteristics value (in case of a negative offset) or after increasing the lower electrical characteristics value (in case of a positive offset).

Each of these comparisons outputs a binary value puf_out representative of the sign of the difference between the characteristics values of the two primitives being tested. Such output values may be saved in variables out_margin0 and out_margin1. If the binary value outputted by the two comparisons is the same, that is to say if out_margin0=out_margin1, then the tested pair of primitives is considered as providing a robust (stable) bit and the pair is qualified during the qualification step S3. Assuming that the subset of primitives contains N+1 pairs of primitives, a loop of N+1 occurrences of two such comparisons is performed for testing all primitives of the subset of primitives to be tested.

As a result, the puf_margin_check value acts as the reference threshold of the method according to the first aspect: during the assessing step S2, for a given primitive pair, if the binary output of the comparison puf_out remains the same when applying the offset either to one of the primitives or to the other, the comparator determines that the difference between the electrical characteristics values provided by the primitives of this pair, without injecting any offset, is greater than this threshold, and then it qualifies the pair during the qualification step S4.

As the difference between primitive values follows a normal law, for a given value of puf_margin_check, it is possible to calculate the average proportion of bit marked as robust.

Assuming that "Iref" is the average of primitive values, that "σ" is the variance of primitive difference and "μ" is the primitive difference between INP and INN, the percentage of qualified pairs can be estimated using the following formula:

$$\% \text{ puf\_marked\_as\_robust} = 100 * 2 * \int_{-\infty}^{-Iref*puf\_margin\_check} \frac{1}{\sigma\sqrt{2\pi}} e^{-\frac{1}{2}(\frac{x-\mu}{\sigma})^2} dx$$

Where "dx" stand for the integral annotation to select value "x" to be integrated.

As a consequence, the reference threshold may be adjusted in function of a targeted ratio of qualified pairs to all pairs of the subset.

Thanks to the invention, the workload corresponding to the selection of the robust (i.e. reliable) bits is performed once during an early phase of the device life. Thus when running a PUF, the post processing operations are dramatically reduced and time is saved each time the PUF must be executed. In addition, power consumption is decreased when getting the PUF response.

Since the percentage of qualified pairs can be estimated according to the reference threshold, it makes possible to finely adjust the size of the subset of pairs.

The invention allows to discard pairs whose result may vary with external conditions and aging.

Since the pairs are selected using a comparison done between two identical primitives, the invention remains independent of the power applied to the device. In other words, the list of qualified pairs does not depend on the level of voltage or current applied to the device.

An advantage of the invention is to be independent of the underlying technology used for the design of the device. It may apply to a wide range of devices.

The invention is not restricted to a chip. It may apply to any device comprising a plurality of electronic basic elements which may be coupled by pairs. For example it applies to SOC systems or system comprising several chips.

The invention claimed is:

1. A method of identifying primitives for implementing a physical unclonable function providing a response representative of a device,
    wherein said device comprises a plurality of primitives coupled in pairs (P1, . . . , P6), wherein the primitives are electronic units,
    and wherein said primitives are configured for being one-time programmable by changing their state from a not-programmed state to a programmed state through application of a burning energy to said primitives, the method comprising:
    selecting (S1) a subset of the pairs,
    assessing (S2) a difference between electrical characteristics values provided by primitives belonging to each pair of said subset,
    qualifying (S3) all pairs of primitives for which the assessed difference is higher than a reference threshold, and
    identifying (S4) said qualified pairs of primitives, said identifying step comprising a step of programming (S4) at least one primitive of each pair of primitives for which the assessed difference is lower than said reference threshold, by applying a burning energy to said at least one primitive so as to differentiate qualified pairs of primitives from those that are not qualified.

2. The method according to claim 1, wherein the reference threshold is adjusted in function of a targeted ratio of qualified pairs to all pairs of the subset.

3. The method according to claim 1, wherein, at least one primitive of the device being a transistor, the step of programming at least one primitive comprises applying a voltage on a gate of at least one transistor.

4. The method according to claim 1, wherein both primitives of each pair of primitives for which the assessed difference is lower than said reference threshold are programmed.

5. A method for executing a physical unclonable function of a device,
wherein said device comprises a plurality of primitives coupled in pairs (P1, ..., P6), wherein the primitives are electronic units,
wherein said primitives are configured for being one-time programmable by changing their state from a not-programmed state to a programmed state through application of a burning energy to said primitives, and some of said pairs of primitives have been identified as qualified by
selecting (Si) a subset (20) of the pairs,
assessing (S2) a difference between electrical characteristics values provided by primitives belonging to each pair of said subset,
qualifying (S3) all pairs of primitives for which the assessed difference is higher than a reference threshold, and
identifying (S4) said qualified pairs of primitives, said identifying step comprising a step of programming (S41) at least one primitive of each pair of primitives for which the assessed difference is lower than said reference threshold, by applying a burning energy to said at least one primitive so as to differentiate qualified pairs of primitives from those that are not qualified,
wherein the method comprises:
reading (EI) a state of all primitives of said device,
based on said read states, differentiating (E2) the qualified pairs of primitives identified according to the method of claim 1,
generating (E3) a physical unclonable function response only from primitives belonging to said qualified pairs.

6. The method for executing a physical unclonable function of a device of claim 5 wherein a programming step has been performed according to claim 3, and wherein the step of reading a state of a primitive of said device (E1) comprises when said primitive is a transistor:
injecting a current through a gate of said transistor,
comparing a voltage of said gate to a voltage reference,
based on said comparison, determining the state of said primitive.

7. A device comprising a plurality of primitives coupled in pairs (P1, ..., P6), wherein the primitives are electronic units,
wherein said primitives are configured for being one-time programmable by changing their state from a not-programmed state to a programmed state through application of a burning energy to said, primitives, wherein the device comprises:
a selector configured to select a subset of the pairs of primitives,
a comparator configured to assess a difference between electrical characteristics values provided by primitives belonging to each pair of the subset, and configured to qualify all pairs of primitives for which the assessed difference is higher than a reference threshold, said qualified pairs corresponding to primitives selected for implementing a physical unclonable function providing a response representative of the device,
and a programming circuit configured to program at least one primitive of each pair of primitives for which the assessed difference is lower than said reference threshold, by applying a burning energy to said at least one primitive so as to differentiate qualified pairs of primitives from those that are not qualified.

8. The device according to claim 7, wherein the device comprises a generator configured to generate a PUF response by running the physical unclonable function, the generator being configured to generate the response from only the qualified pairs.

9. The device according to claim 7, wherein the device is a chip or a system-on-a-chip.

10. The device according to claim 7, wherein the device is a printed circuit board and primitives are electronic components.

11. The device according to claim 10, wherein at least one primitive of the device is a transistor.

12. The device according to claim 7, wherein the device is a RFID tag.

* * * * *